United States Patent [19]
Higgins et al.

[11] Patent Number: 5,091,968
[45] Date of Patent: Feb. 25, 1992

[54] OPTICAL CHARACTER RECOGNITION SYSTEM AND METHOD

[75] Inventors: Raymond L. Higgins, Kitchener; Dennis W. Golem, Waterloo, both of Canada

[73] Assignee: NCR Corporation, Dayton, Ohio

[21] Appl. No.: 635,899

[22] Filed: Dec. 28, 1990

[51] Int. Cl.⁵ .............................................. G06K 9/64
[52] U.S. Cl. ........................................ 382/30; 382/16; 382/10
[58] Field of Search ...................... 382/30, 8, 16, 47, 9, 382/50, 27, 52; 358/444, 452

[56] References Cited
U.S. PATENT DOCUMENTS

| | | | |
|---|---|---|---|
| 4,295,121 | 10/1981 | Enser et al. | 340/146.3 |
| 4,466,121 | 8/1984 | Damen et al. | 382/9 |
| 4,471,046 | 9/1984 | Matsunawa et al. | 382/9 |
| 4,547,811 | 10/1985 | Ochi et al. | 358/280 |
| 4,625,330 | 11/1986 | Higgins | 382/27 |
| 4,783,829 | 11/1988 | Miyakawa et al. | 382/30 |
| 4,805,224 | 1/1989 | Koezuka et al. | 382/30 |
| 4,817,171 | 3/1989 | Stentiford | 382/30 |
| 4,850,026 | 7/1989 | Jeng et al. | 382/30 |
| 4,856,075 | 8/1989 | Smith | 382/50 |
| 4,949,392 | 8/1990 | Barski et al. | 382/30 |

Primary Examiner—Michael Razavi
Attorney, Agent, or Firm—Robert S. Hulse

[57] ABSTRACT

A system and method are disclosed for optical scanning and recognition of alphanumeric characters of different sizes and fonts such as E13B, OCRA, OCRB, and Farington 7B type fonts recorded on documents such as bank drafts and checks. The system comprises an optical scanner, a microprocessor, a read-only-memory (ROM), a random-access-memory (RAM, with a stored program) for storing data and a plurality of predetermined character-identification patterns (templates). Each template includes three configurations: an actual pixel patterns (bit configuration) or a character, a configuration representing significant portions of the character which remain the same and do not change despite changes in size of the character, and a configuration representing portions of the character which are given added weight in distinguishing between similar characters. The scanner optically scans each document and produces a plurality of gray-scale pixel values which are stored in the RAM under control of the microprocessor. The microprocessor processes the stored pixel values, and effectively locates and segments each character on the document. The microprocessor then converts the segmented-character pixel value to binary data, and selects, from the plurality of templates, the template that matches the binary data, the matching template serving to identify (recognize) the segmented character.

37 Claims, 5 Drawing Sheets

| SAMPLE TEMPLATE | PATTERN WORD (HEX) | BIT SIG WORD (HEX) | WEIGHT WORD (HEX) |
|---|---|---|---|
| | 00 00 | F0 9F | 00 00 |
| | 00 00 | F0 07 | 00 00 |
| | 07 F0 | F7 F7 | 00 00 |
| | 07 F8 | F7 FF | 00 00 |
| | 00 38 | F0 3F | 00 00 |
| | 00 18 | FF 9F | 00 00 |
| | 00 18 | FF DF | 00 00 |
| | 00 18 | FF 9F | 00 00 |
| | 00 18 | FF 9F | 00 00 |
| | 00 38 | F0 3F | 00 00 |
| | 07 F8 | F7 FB | 60 E0 |
| | 07 F8 | F7 F9 | 60 E0 |
| | 00 7C | F0 7D | 00 00 |
| | 00 1C | FF 9D | 00 00 |
| | 00 1C | FF 9D | 00 00 |
| | 00 1C | FF DD | 00 00 |
| | 00 1C | FF DD | 00 00 |
| | 00 1C | FF 9D | 00 00 |
| | 00 3C | F8 3D | 00 00 |
| | 00 7C | F0 7D | 00 00 |
| | 07 FC | F7 FD | 00 00 |
| | 03 F8 | F3 F9 | 00 00 |
| | 00 00 | FF FF | 00 00 |

SOLID BLACK

FIG. 9

OPTICAL CHARACTER RECOGNITION SYSTEM AND METHOD

BACKGROUND OF THE INVENTION

This invention relates to the scanning of documents and the recognition of alphanumeric symbols generally, and particularly to optical scanning and recognition of alphanumeric characters such as E13B, OCRA, OCRB, and Farington 7B type fonts.

The E13B, OCRA, OCRB, and Farington 7B character sets have received widespread use in financial transactions in the United States and abroad. Generally, the characters are recorded on documents such as bank drafts, checks, and other financial documents. For example, E13B type fonts are generally recorded in MICR (magnetic ink character record) form for scanning by a magnetic scanner.

A vidicon camera system is sometimes used to scan the document and to record an image of it for archival and evidentiary purposes while, in a separate operation, a magnetic scanner system is used to read the magnetic-ink characters (e.g., E13B characters). This need for two separate scanner systems to perform two separate operations presents a costly, time-consuming problem. Further, hardware for processing E13B, OCRA, OCRB and Farrington 7B type character is often complex and expensive, and unduly time-consuming in performing character recognition. Also, such hardware often binarizes the entire image, introducing noise into the binarized image and causing loss of image data, making the recognition process more difficult.

A way of providing for image scanning and character recognition that would eliminate such a two-system two-operation requirement, and that would significantly reduce noise and image-processing time, is needed and would be useful.

SUMMARY OF THE INVENTION

Accordingly, a system and method for optical character recognition are provided which obviate the need for separate magnetic scanner systems and the performance of separate magnetic scanning operations, and reduces noise and image-processing time without causing loss of image data.

In a first aspect of the invention, a system (apparatus) is provided comprising: (a) a CCD scanner for optically scanning an alphanumeric character on a document, the character and document having different opacities, and producing a plurality of gray-scale pixel values corresponding to said opacities, (b) a memory disposed for storing the gray-scale pixel values, a program, and a plurality of predetermined binary patterns, one of said patterns representing the character, and (c) a processor coupled to the scanner and to the memory, and operating under control of the program, for locating the character on the document by selecting from said gray-scale pixel values a matrix of values representative of the character, for converting the matrix values to binary data, and for selecting from the plurality of predetermined binary patterns a pattern that matches the converted binary data, said matching pattern serving to identify the character.

The CCD scanner includes a control logic, the processor includes a microprocessor, and the memory includes a ROM (read only memory) with a boot routine and a RAM (random access memory) with the program, the pixel values, and the binary patterns.

In a second aspect of the invention, a method is provided for optically identifying an alphanumeric character on a document, the character and document having different opacities, the character being represented by one of a plurality of predetermined binary patterns, the method comprising the steps of: (a) optically scanning the character on the document and producing a plurality of gray-scale pixel values corresponding to said opacities, (b) locating the character by selecting, from said gray-scale pixel values, a matrix of values representative of the character, (c) converting the matrix values to binary data, and (d) selecting from the plurality of predetermined binary patterns a pattern that matches the converted binary data, said matching pattern identifying the character.

The characters are recorded on the document in, for example, E13B format. The camera (CCD scanner) scans the document vertically, from bottom to top, starting at the bottom right corner of the document. The document is moved to the right continuously (with the width of each vertical scan corresponding to the diameter of one pixel) until the top left corner of the document is reached indicating that scanning has been completed.

In locating a character (i.e., the gray-scale pixel values representing the character) for processing, the system positions a window over selected pixel values of the character (thereby framing the character) such that the sum of the selected pixel values within the window is a maximum. The system then determines the arithmetic mean of the dark pixels within the window. It does this by determining the arithmetic mean of pre-selected ones of the selected pixel values (the preselected ones representing pixel values above a predetermined threshold, the predetermined threshold representing a value greater than the character's background level (determined by pre-scan of the character). The system then converts the selected pixel values to binary data relative to said mean (i.e., converts to one or zero depending on whether the magnitude of each selected pixel value is less than, or is greater than or equal to, said mean). The binary data is then logically compared to each of the predetermined binary patterns until a matching pattern is found which best identifies the character. The predetermined binary patterns represent binary templates, each pattern (template) having three bit configurations (levels), a first bit configuration representing the actual bit pattern of the character, a second bit configuration representing the significance of the bits of the actual bit pattern, and a third bit configuration representing weighted values for the bits of the actual bit pattern. The extent to which the converted binary data logically compares to each of the three bit configurations of each of the predetermined bit patterns is expressed as mismatch words, from which mismatch counts are calculated. The mismatch counts are then compared to at least one predetermined threshold value, and the lowest mismatch count that is below (less than) the threshold value is selected as representative of the character.

Thus, as indicated above, the system performs segmentation of characters from the gray-scale image and binarizes the segmented characters for subsequent recognition, rather than binarizing the entire image for recognition of characters as do prior-art systems. Also, whereas such prior binarization of the entire image introduced undue amounts of error (noise) into the scanned data, the method of the present invention reduces such errors by using gray-scale values in the character-segmentation process. Further, the system is able to recognize different fonts (i.e., different characters at different resolutions) merely by storing template tables for that font.

DESCRIPTION OF THE PREFERRED EMBODIMENT

Figure 1:
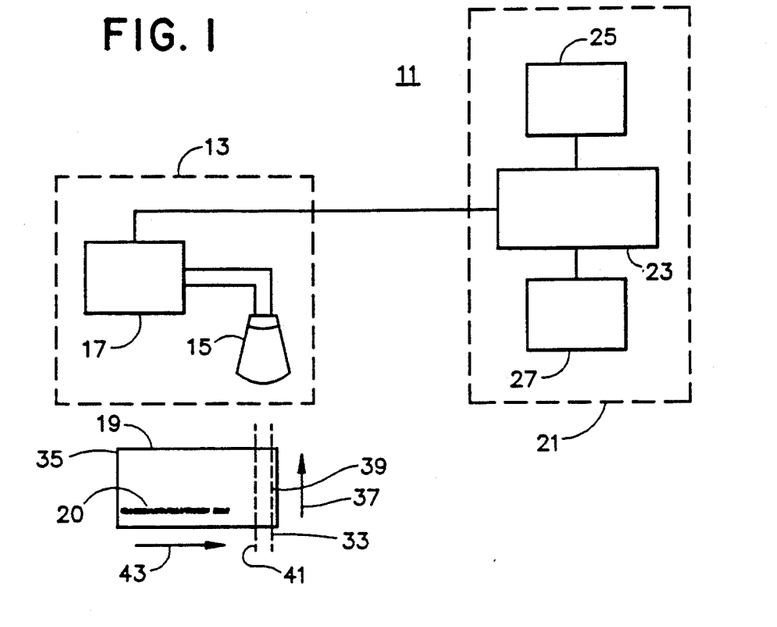
FIG. 1 is a block diagram of the system of the present invention.

Referring now to FIG. 1, there is shown a system (apparatus) 11 of the present invention. The system includes and optical reader or scanner 13 for scanning a document 19, and a computer system 21 for processing data received from the scanner 13. The scanner may be a camera with a CCD (charge coupled device) 15 and a controller 17. The document 19 may be a bank draft or check with numeric character or other alphanumeric symbol 20 recorded thereon. The computer system 21 comprises a microprocessor 23, a ROM (read-only-memory) 25 with a boot program, and a RAM (random access memory) 27, with a stored program, for storing data from the scanning device and from the microprocessor and for storing predefined data.

The scanning operation is commenced at the bottom right corner 33 of the document 19 and ends at the top left corner 35. The scanner 13 scans the document 19 vertically, from bottom-to-top, as shown by arrow 37, first along right-most virtual scan line 39, then again from bottom-to-top along next-right-most virtual scan line 41, and so on until the top left corner of the document is reached. The virtual scan lines are arranged in parallel. The document 19 is moved continuously from left to right, as shown by arrow 43, while the scanner scans along successive scan lines, the width of each scan line corresponding to the diameter of a pixel (approximately 0.0127 cm or 0.005 inch).

Figure 2:
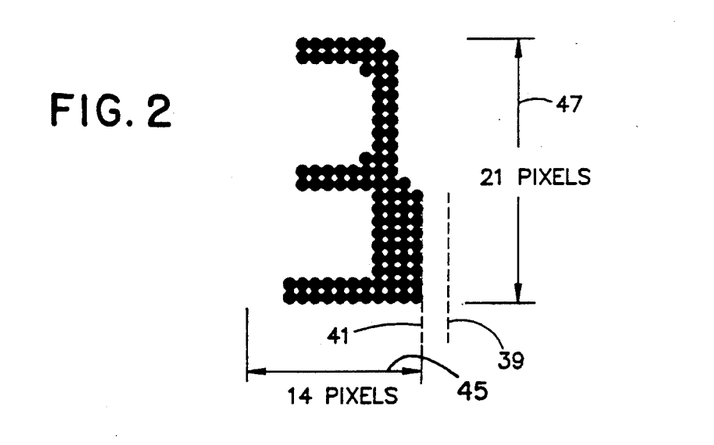
FIG. 2 is a graphic illustration of the appearance of a character scanable and identifiable by the system of FIG. 1.
Figure 3:
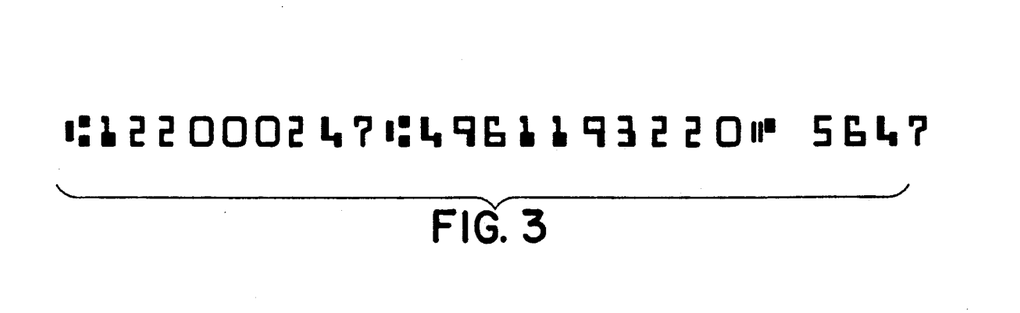
FIG. 3 is a graphic illustration of a portion of a document with various characters recorded thereon.
Figure 4:
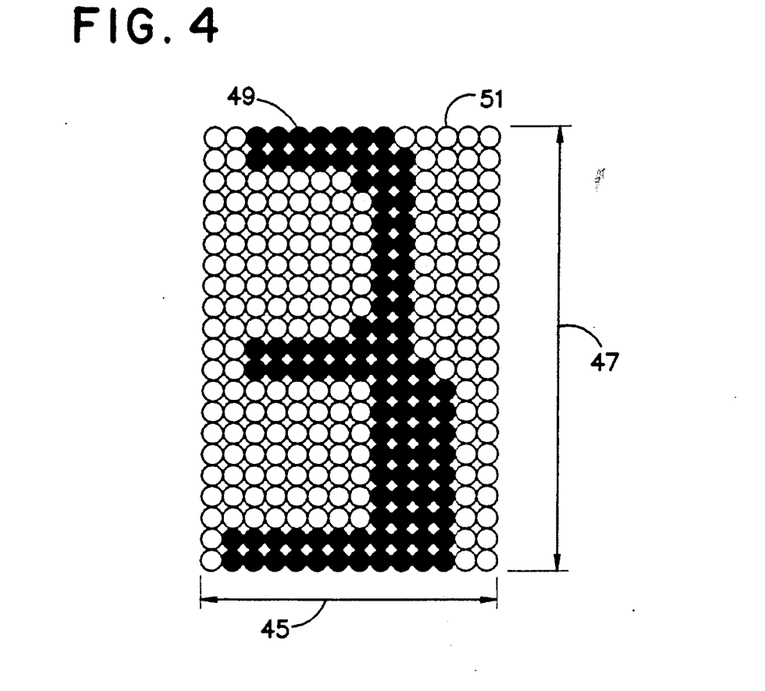
FIG. 4 is a graphic illustration of a scanned character having a matrix of pixels of different opacities (gray-scale values)

An example of a read line of a document is shown in FIG. 3. When a document is scanned, the pixel values generated by the scanner to represent the document, including the characters thereon, are stored in memory 27 (FIG. 1). The characters of each read line are stored as a data array (matrix) having, for example, typically one hundred rows, corresponding to the read line's height, and twelve hundred columns corresponding to the document's length (twelve hundred being the typical number of columns for a six-inch document at 200 pixels per inch). Within the data array, a character (when one is located and segmented as described below) is represented by a matrix of rows (e.g., twenty-one, corresponding to the character's height) and columns (e.g., fourteen, corresponding to the character's width). The character "three" shown in FIG. 2, for example, may be represented in pixel array form as depicted in FIG. 4. Each pixel 49 represents a portion of the document and has an opacity index or gray-scale value in the range 0–255. The dark pixels generally have a greater gray-scale value (approaching 255), and the light pixels generally have a lesser gray-scale value (approaching 0). Since characters are normally printed in a dark color compared to the generally light colored background of the document, the difference in opacity between the character and its background is easily determinable.

Figure 5:
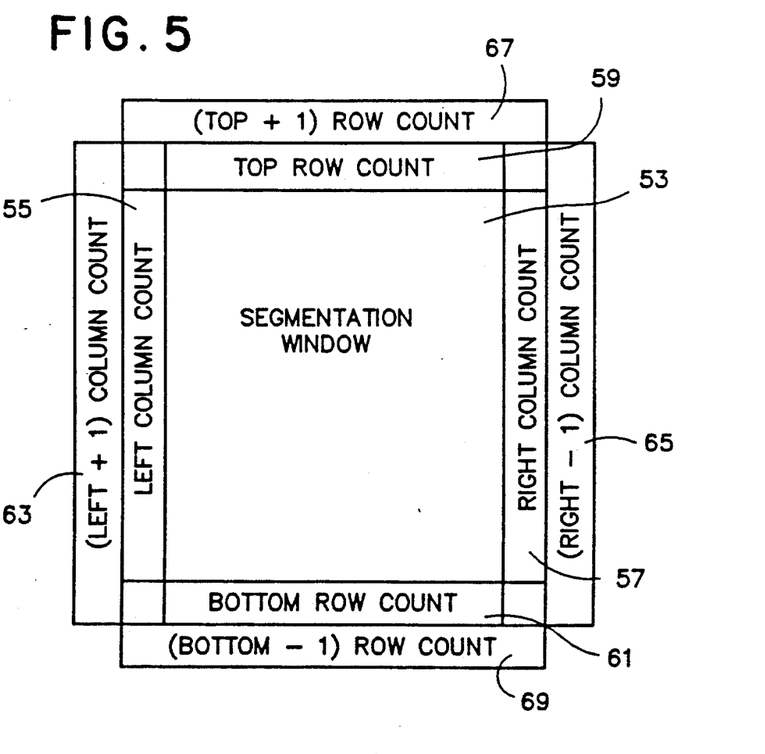
FIG. 5 is a graphic illustration of a window used for framing a character.

As indicated above, these gray-scale data values are generated by the scanner, upon scanning the document. The generated data are then stored in memory 27 (FIG. 1) for processing by the system 21. The system, under control of the stored program, examines the stored data values, and proceeds to locate a first character, then successive characters of a first field, then other characters of successive fields. Upon locating a character, the system proceeds to frame or delimit the character (i.e., to separate-out or segment the character from other characters). Starting with the stored gray-scale data values obtained from scanning the document from bottom-to-top along the right-most scan line 39 (FIGS. 1 and 2), and then from bottom-to-top along the next-right-most scan line 41, and so on, the system locates and frames (segments) each of the characters as described below. It does this by first searching the stored data for a rise in gray-scale value representing a transition from a light pixel to a dark pixel, vertically from bottom to top along the scan line. If a rise of more than, for example, forty (the particular value, such as forty, being font dependent) is found between two gray-scale values of adjacent pixels in the scan direction 37, a dark pixel is deemed to be found. The region (of the document) proximate to the dark pixel is regarded as a region where a character is likely to be found. When a dark pixel is found, the system checks the character region (i.e., checks the stored data proximate to the dark pixel value) to determine if the dark pixel is part of a character. It checks for the presence of a character by establishing a segmentation window of sufficient size to effectively frame the character on the document, the position of the dark pixel corresponding to the center of the window. As depicted in FIG. 5, a segmentation window 53 is shown having left and right edges (columns) 55,57, and top and bottom edges (rows) 59,61. Bordering the left and right edges are columns(left+1) 63 and (right−1) 65, and bordering the top and bottom edges are rows (top+1) 67 and (bottom−1) 69.

Figure 6:
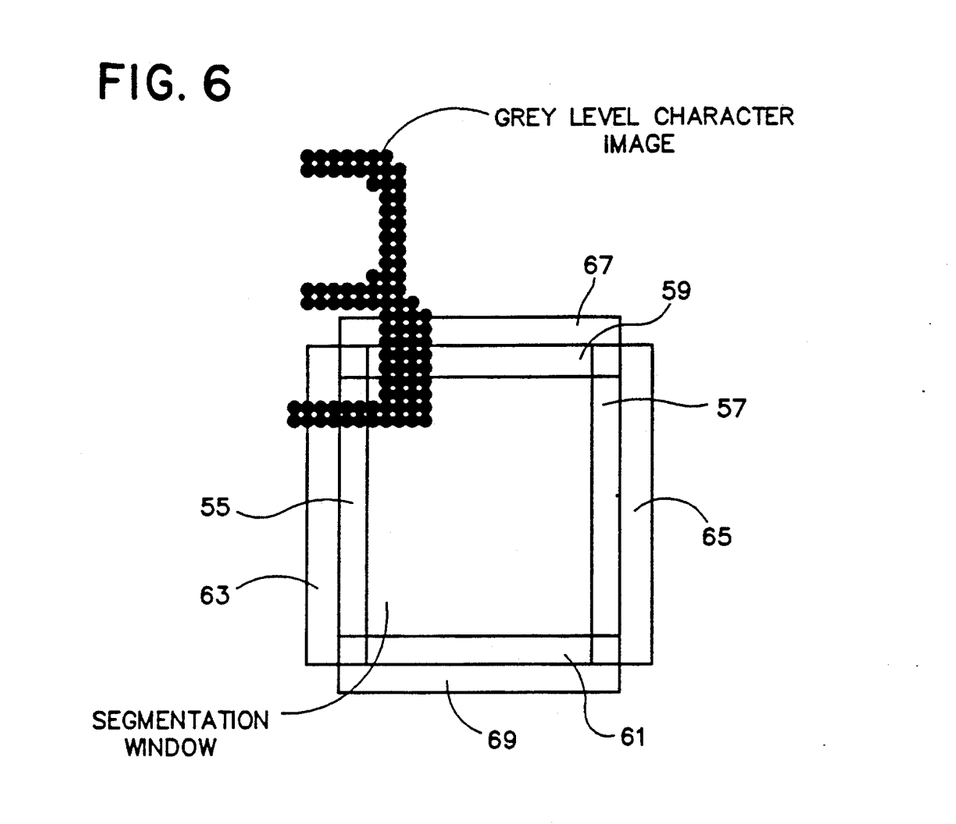
FIG. 6 is a graphic illustration of the window of FIG. 5 used in framing the character of FIG. 4.

As explained below with reference to FIGS. 5 and 6, a character is considered framed and positioned in the center of the window when the sum ($S_w$) of all the gray-scale pixel values in the window is maximum. To determine whether the sum ($S_w$) increases when the window is moved, the sums of the pixel values in each of the left and right columns 55,57 and in each of their bordering columns 63,65 are calculated. Likewise, the sums of the pixel values in each of the top and bottom columns 59,61 and in each of their bordering columns 67,69 are calculated. If, for example, the sum in column 63 is found to be greater than the sum in column 57, and would cause the sum ($S_w$) in the window to increase when the window 53 is moved by one pixel leftward to include column 63 and exclude column 57, then the window is moved leftward. Likewise, if by moving the window by one pixel upward to include row 67 and exclude row 61, the sum ($S_w$) in the window would increase, then the window is moved upward. Thus, from the sum (cumulative count) of the pixel values of the respective rows and columns adjoining (bordering) the window, relative to the sum of the pixel values of the respective rows and columns at the edges of the window, the direction can be determined in which the window can be moved to increase the sum ($S_w$) of the pixel values within the window. As shown in FIG. 6, according to the following counts:

Right−1 column count=0
Right column count=0
Left column count=100
Left+1 column count=100
Bottom−1 row count=0
Bottom row count=0
Top row count=170
Top+1 row count=170 the window count is increased by 100 upon a move leftward, and increased by 170 upon a move upward. Therefore, the window is moved leftward and upward. Thus, the window is moved in the direction which increases $S_w$, and this operation is repeated until no movement of the window in any of the four directions (left, right, up, down) increases $S_w$. The window is then considered to have framed (delimited/segmented) a character, with the character positioned at the center of the window. Thus, by means of the window a matrix of pixel values most representative of the character is selected (framed).

As a check to determine if there is enough information (dark-pixel gray-scale values) in the window to represent the framed character, the total number of pixels in the window that exceeds a predetermined confirmation threshold (e.g., a threshold gray-scale value of 100) is obtained. If the total number is greater than, for example, sixty (for the E13B font), then a character is confirmed to be found in the window. Otherwise, the object framed in the window is interpreted as noise, and the system proceeds to find the next character.

After segmentation, the segmented (framed) character is scaled in preparation for identification (recognition). Sixteen bit words are used in the recognition process (i.e., width of template is 16 pixels). Because many characters are wider than 16 pixels (including E13B characters which are 19 pixels wide), they are converted to 16 bits after segmentation. This is accomplished by eliminating predetermined columns e.g., for the E13B font, columns 4, 9 & 14 are eliminated. (OCRA and OCRB fonts are 16 pixels wide, at two hundred pixels per inch, and do not need to have columns eliminated.)

The preceding describes how a character is located in preparation for processing, i.e., how it is effectively located on a document and framed (segmented) for later processing. The following describes how the framed character is converted to binary form then matched to a template (predetermined binary pattern) for the purpose of identifying (classifying/recognizing) the character.

Figure 7:
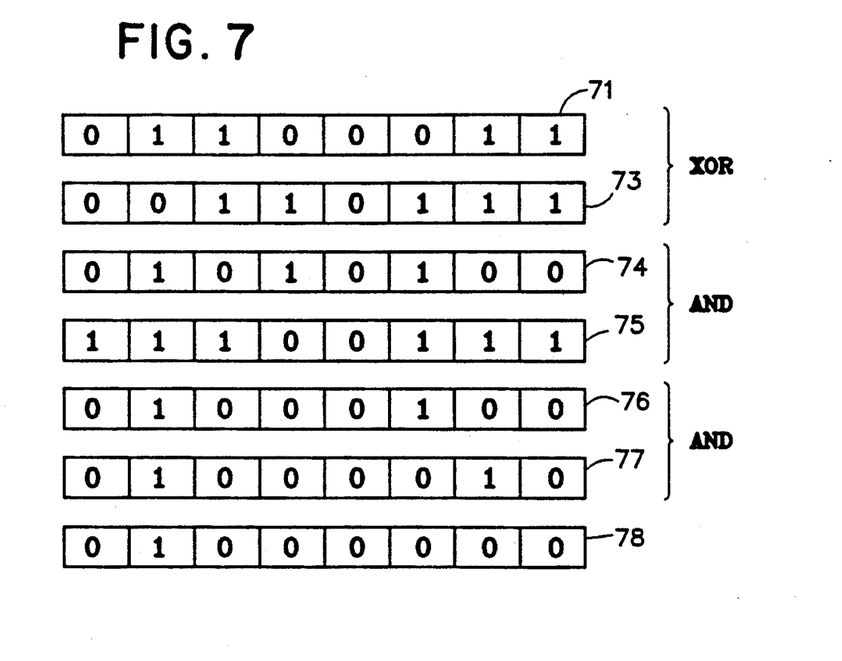
FIG. 7 is a block diagram showing the results of various logical operations performed on binary data representing the scanned character.

In the conversion operation, the stored gray-scale pixel values for each row of the framed character are converted to binary form. First a reference threshold value is calculated as the arithmetic mean of the dark pixels of the framed character (as previously described). Then, the gray-scale pixel values are converted to binary form relative to the reference threshold. For example, if the calculated reference threshold is one hundred, then, using the binary equivalence scale shown below:

| Gray-Scale Pixel Values | Binary Equivalent |
|---|---|
| ≧100 | 1 (black) |
| <100 | 0 (white) | a row of gray scale values of 80, 120, 130, 90, 85, 70, 110, 135 may be converted to binary data having the bit pattern 01100011, as shown in the eight-bit word 71 of FIG. 7.

This binary data (which represents a row or slice of the framed character) and other rows of converted binary data representing the character are then compared to a plurality of templates, each template corresponding to a character. Each template represents a predetermined pattern of binary data and comprises three distinct layers (bit configurations). The three eight-bit words 73, 75, 77 shown in FIG. 7 represent an eight-bit row in each of the three layers. The first layer (bit-pattern layer, corresponding to pattern word 73) represents the actual black/white (0/1) bit pattern of the character. The second layer (bit-significance layer, corresponding to bit-significance word 75) identifies the bit positions of the character that are significant and those that are not significant. One-bits identify significant bit positions where the bit pattern of the character is expected to remain unchanged regardless of small changes in size and shape of the character. Zero-bits identify non-significant bit positions where the bit pattern need not be the same for different sizes or shapes of the character. The third layer (bit-weight layer, corresponding to weight word 77) identifies which bits are critical, and hence have greater weight than others, in distinguishing between like (substantially similar) characters. In this third layer, 1-bits are designated as weighted bits, and 0-bits are designated as non-weighted bits. For example, 1-bits in the top row of the third layer of the template for the characters "O" and "U" would be useful in distinguishing between the two characters, and 1-bits in the bottom row of the third layer of the templates for the characters "Q" and "O" would be useful in distinguishing between the Q and the O.

As shown in FIG. 7, various logic operations are performed by processor 23 (FIG. 1) on the binary data 71 in order to identify the character. (The logic operations are actually performed as sixteen-bit operations. However, for simplicicity, eight-bit operations are shown). First, the binary data is EXCLUSIVE-OR'd with the corresponding word 73 of the bit-pattern layer to produce a pattern of mismatch 74 between the binary data 71 and the predetermined correct pattern 73. This mismatch pattern 74 is then logically ANDed with the corresponding word 75 of the bit-significance layer for producing a mismatch word 76, representing the extent of mismatch independent of character size and shape. The mismatch word 76 is then weighted, i.e., logically ANDed with the corresponding word 77 in the bit-weight layer to produce a weighted mismatched indicator 78. (If weighting word 77 contained no 1-bits, no weighting or ANDing would have been performed (in order to save processing time since the outcome would be zero), and the system would have proceeded with processing the next row of binary data.)

Following the weighting operation, a mismatch count ($MC_R$) is calculated for the row of binary data 71. This calculation is performed by processor 23 (FIG. 1) as follows:

$$MC_R = MC_W + (WOC \times WF)$$

(1) where, $MC_W$ represents a mismatch count for the mismatch word (i.e., the number of ones found in mismatch word 76), WOC represents a mismatch indicator or weight out-put count (i.e., the number of ones found in mismatch indicator word 78), and WF represents a predetermined weighing factor (e.g., the integer 2 for E13B type characters).

Thus, for the mismatch bit pattern shown in the words 76 and 78 in FIG. 7, it can be seen that $MC_W=2$, $WOC=1$, and $WF=2$. Therefore, the mismatch count ($MC_R$) calculated for the row of binary data 71 would equal four (i e., $2+(1\times 2)$ according to equation 1 above).

After calculating the mismatch count for one row, the system proceeds to calculate, as indicated above, the mismatch count for all remaining rows of the character. The mismatch counts for all the rows of the character are then summed to produce a template mismatch count (i.e., a mismatch count for the template as applied to the framed character). In a similar manner, for the other templates of the character set for the font being processed, a mismatch count is produced for each template relative to the framed character. The two lowest template mismatch counts and their associated template numbers are stored in memory as the various templates are processed. The criterion for identifying a character is: if the template with the lowest count is below a threshold (a reject threshold of 40 for E13B fonts) and is lower than the next lowest template by a predetermined amount (a difference threshold of 5 for E13B fonts), it identifies the character.

Figure 8:
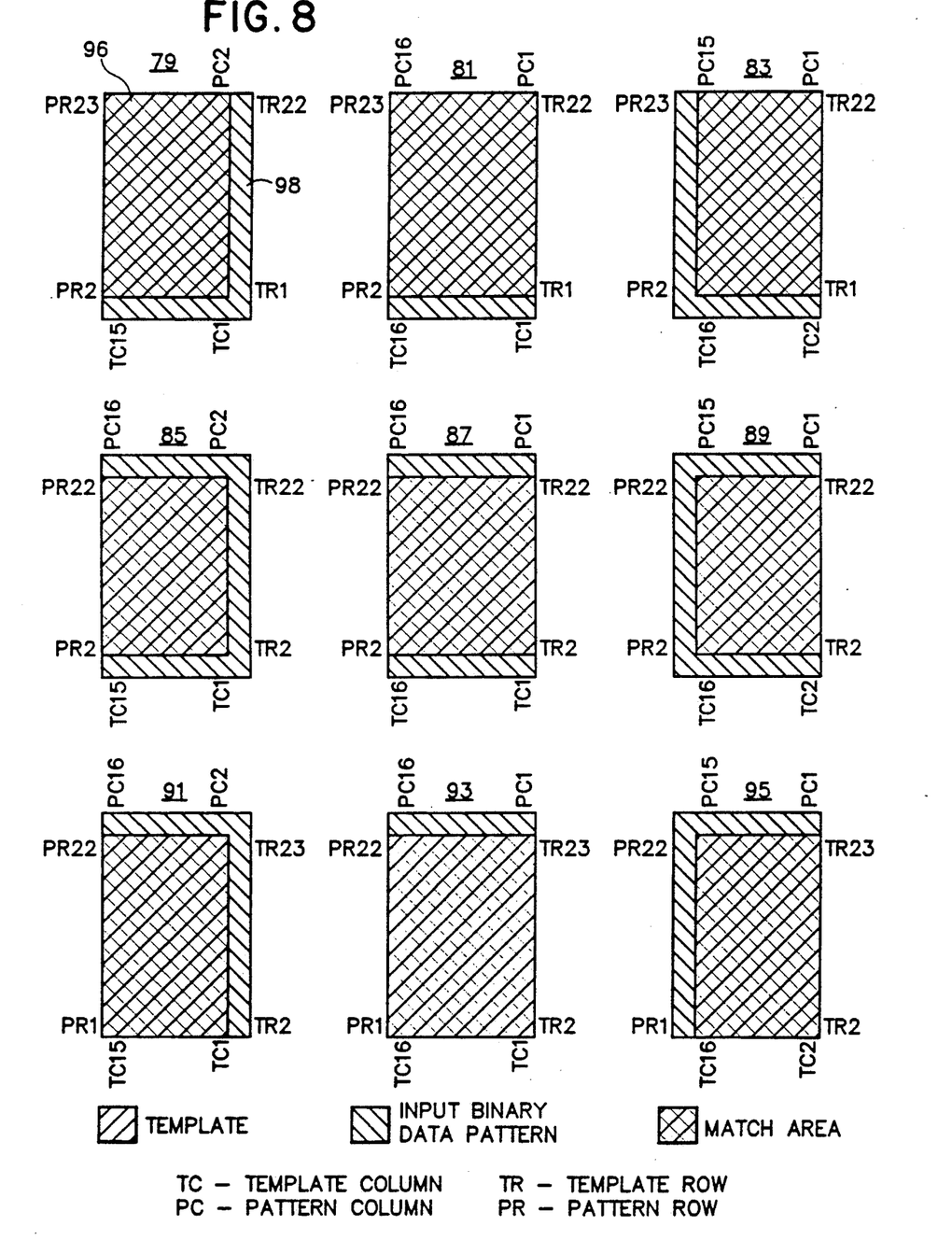
FIG. 8 is a block diagram of a matrix representing various portions of the image of a framed character.

Template recognition, as described previously, can be performed in a total of nine positions as shown in FIG. 8. This is done in order to identify characters that may not be perfectly framed due to factors like noise in the image. In the example shown in FIG. 8, the template and input (binary data) pattern sizes are 23 rows (high) by 16 columns (wide). The three layers of the template (pattern layer, bit significance layer and weighting layer) are all shifted (moved) the same amount and in the same direction. In the description of shift positions presented below, template row refers to the bit pattern row, bit significance row and bit weight row.

In the center position 87, the template 96 is placed directly over the input pattern 98. Only rows 2 through 22 are used in this match. Thus, template row 1 is compared to pattern row 1, template row two is compared to pattern row 2 and so on. All columns (1 through 16) are used in the center horizontal positions 81, 87, 93. In the upper center position 81, rows 1 through 22 of the template are compared to rows 2 through 23 of the input pattern. This is the same as shifting the template pattern vertically upwards by one row. In this case, template row 1 is compared to input pattern row 2, template row 2 is compared to input pattern row 3 etc. All columns of the template and input pattern are compared in this situation (the horizontal center). Similarly, in the lower center position 93, the template is shifted down by one row, thus matching template rows 2 through 23 against input pattern rows 1 through 22.

The horizontal shift positions correspond to a shifting of the template 96 to the left or right over the input pattern 98. In the center left position 85, template columns 1 through 15 are used and input pattern columns 2 through 16 are used. (Since it is a center position vertically, rows 2 through 22 are used for both the input pattern and the template.) Thus, template word bit 1 is compared to pattern word bit 2, template word bit 3 is compared to pattern word bit 4, and so on.

For example, if the template pattern layer word is:

0011111100001111 and the input character pattern word is:

0010111100011110

The template is shifted left 1 bit (column):

0011111100001111 and the result of the exclusive Or operation would be:

0101000100000000

It should be noted that when a shift left operation is performed, the rightmost bit (least significant bit, LSB) is 0. Thus, the LSB of the bit-significant word will be 0 also (since all three layers are shifted in the same direction and amount) and, as such, the LSB of the mismatch word 76 (after the AND operation with the bit-significant word) will always be 0. Similarly, a shift to the right makes the leftmost bit (most significant bit, MSB) a 0 and, as such, the MSB of the mismatch word 76 (after the AND operation) will always be 0.

A horizontal shift to the right (position 89) is similar to the left shift, only in the opposite direction. Thus, bit 2 of the template word would line up (be compared to) bit 1 of the input pattern word.

The corner positions (positions 95, 91, 83, 79) represent a combination of a vertical shift of one row and a horizontal shift of one column. As an example, in the upper left position 79, the template row 1 is shifted left by one bit position and compared to pattern word 2, and template row 2 is shifted left by one bit position and compared to pattern word 3, and so on.

To recognize a character using this method requires nine passes per template times the number of templates in the character set. For example, an alphanumeric character set with 49 characters would require a total of 441 (9*49) matches being done. This can be too time consuming. To promote faster character identification, only the center position of each template is compared initially to the input pattern. The lowest two mismatch counts and their corresponding template numbers are stored in memory 27 as the various templates are processed. At the end of this first pass, the other eight positions of only these two templates are processed to find the best possible (i.e., lowest) total mismatch against the input pattern. Thus, only 65 (1*49+2*8) matches need to be made ordinarily (i.e., about 15% of the 441 matches that were required).

A description of the criteria for accepting or rejecting a character is presented below.

The lowest template mismatch count is compared to a predetermined reject threshold for the character that the template represents. If the template mismatch count for this character is below this threshold and the difference in template mismatch counts for the lowest two templates (second lowest mismatch minus lowest mismatch) is greater than a predetermined amount (e.g., 10), the template with the lowest template mismatch identifies the framed character. The reason for checking if the mismatch counts are too close is done to discriminate between characters that are very much alike (e.g., Q and O). If the mismatches are similar, the character is rejected rather than risking a misidentification (misread). If no template mismatch falls below the reject threshold discussed above or the two template mismatch counts are too close together, a post processing operation (described below) is performed. If after the post-processing operation the framed character is still rejected, its image is enhanced and converted to binary form (as described below). The recognition process (described above) is then performed again. If the character is identified (satisfies the above criteria), the system then proceeds to process (locate and frame) the next character as described above.

By examining the center positions only, the possibility may be missed that a character, other than the closest two, may have a closer count in a position other than the center and be the correct choice. The post processing operation can remedy such a situation. If the lowest two characters chosen are both over the predetermined reject threshold for that individual character or the inter-character distance (second lowest mismatch-lowest mismatch) is too small, a number of other templates may be tested in the other eight positions in an attempt to find a better match. The choice of which templates to process is made, for example, based on the closest character's similarity to the templates. For example, the closest two characters (those with the lowest mismatch counts) chosen, the letters D and O, both have mismatch counts above their individual reject threshold. In post processing operation, a predetermined set of characters that are similar to D and O would then be processed. This could include characters 0 (zero), Q, C and U. The mismatch counts of the closest two characters after this operation are checked (the one with the lowest mismatch count is checked first) to see if they meet the reject criterion and intercharacter distance criterion. If at least one character meets the criteria, that character is returned as the result, and processing (locating and framing) of the next character in the image proceeds.

If neither of the above characters meets the reject criteria, or the inter-character distance is too small, the framed character is rejected. In this case, its image is enhanced, (as described below), the character is rebinarized, and the recognition process described above is repeated a second time. If the character is recognized, it is returned. Otherwise, a reject character code is returned as the result, and processing (locating and framing) of the next character on the document continues.

In addition to the reject threshold described above, an exit threshold (e.g., the value 10) may also be used in the character identification process as described below. To enhance processing speed, successive template mismatch counts are compared to the exit threshold value, and the first template with a template mismatch count that falls below the exit threshold value would identify the character. In which event, the remaining templates are not processed (which enhances processing speed).

Further, to speed the character identification process, if, while the individual rows of a template are being processed, the mismatch count of the current template (i.e., the template currently being processed) is found to be larger than the second-lowest-count-obtained-thus-far, processing of the current template may be discontinued since this current template is no longer a contender to be one of the two with the lowest template mismatch counts. To further enhance recognition speed, the templates may be presequenced in the order in which they are most likely to occur (e.g., numbers before vowels followed by consonants in an alphanumeric font). If the mismatch is below the exit threshold (as mentioned above), the remainder of the templates need not be examined. Thus those characters occurring most frequently should be examined first. Also, to promote faster character identification, only the center position may be tested by the templates, after which, if the lowest template mismatch count is above the exit threshold, the remaining eight positions for each of the two templates closest to the exit threshold may be processed, and the template with the lowest template mismatch count selected as representative of the character. Further, to speed identification, the remaining eight positions (FIG. 8) may be processed in the following sequence 79, 81, 83, 85, 89, 91, 93, 95. This is the order in which the character is most likely to be positioned.

After identifying the framed character, the system proceeds to process the next character (i.e., to process the next group of stored pixel values representing the region on the document proximate to the framed character) by moving the segmentation window a selected number of pixels (e.g., three pixels) to the left of the previously framed character. The character in this proximate region is then framed (segmented) and identified as described above. All of the remaining characters (remaining stored pixel data) are processed in this manner until end-of-field is detected (i.e., no more characters have been located or an end-of-field character has been located).

If, during the character-identification process a character is rejected, its image is enhanced to facilitate identification. The image may be enhanced, for example, by producing a character image having constant stroke widths (i.e., having a constant number of dark pixels across the width of each vertical stroke or horizontal stroke of the character). This is accomplished as described below. First, the gray-scale pixel values (e.g., 6-bit, 8-bit, or 16-bit values) representing the character are converted to a lesser range of values (e.g., 3-bit gray-scale pixel values for faster processing), then the individual pixels of the character image are examined and only those pixels that are the darkest two or three pixels of the stroke are turned black, others are turned white. This produced a binary image with constant stroke widths as described for example in U.S. Pat. No. 4,625,330, incorporated by reference herein).

As an assist for improving character identification, the edges of each character may be processed as described below. As mentioned above, each template used in the character identification process corresponds to one character of the selected character set (e.g., the E13B character set) and, as shown in FIGS. 2 and 4, each character is fourteen pixels wide by twenty-one pixels high. One extra column is added to the left and to the right of the character, and one extra row is added to the top and to the bottom of the character. This results in a character size of 16 by 23. Corresponding to each character, each template is sixteen pixels wide by twenty-three pixels high. Each template has an extra column on each side (right side and left side) of the fourteen-column character, and one extra row on the top and an extra row on the bottom of the twenty-one-row character. Each extra row comprises sixteen white pixels, and each extra column comprises twenty-three white pixels. The extra rows and columns serve to surround the 14×21 character region with a border of white pixels for better identification of the edge portions of certain characters, as explained below. For example, if the character "E" is matched against a 14×21 "F" template, and the template is shifted upward one pixel position, the pixel values at the bottom of the "E" would be lost since it could not be used in generating the template mismatch count. This could result in mis-identification of the E as an F since the mismatch count would be low. With the 16×23 template, the bottom of the E would not be lost and would contribute substantially to the mismatch count against (relative to) the bottom white row of the F template, thereby avoiding mis-identification of the E as an F. A similar explanation holds with respect to the right and left column positions of the 16×23 template, the columns serve to reduce misidentification between characters such as "B" and "3".

Figure 9:
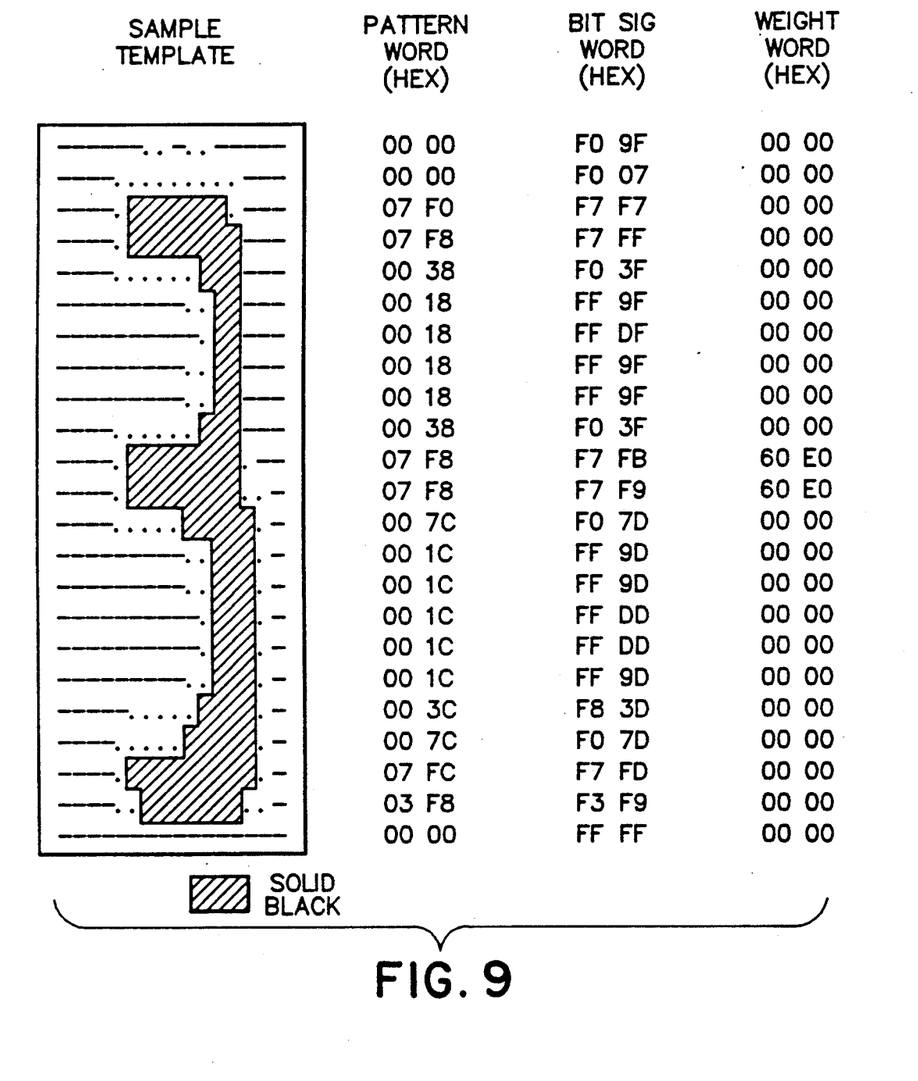
FIG. 9 is a graphic/tabular illustration of a template and associated binary values used by the system of FIG. 1.

As shown in FIG. 9, each 16×23 template may be represented by sixty-nine sixteen-bit words of RAM 27 (corresponding to a scan of two hundred pixels per inch). Of the sixty-nine words, twenty-three represent first layer bit-pattern words, twenty-three represent second-layer bit-significance words, and twenty-three represent third-layer bit-weight words. Each set of twenty-three words correspond to the height of the character, and each sixteen-bit word correspond to the width of the character. (In FIG. 7, for simplicity, eight bits rather than sixteen bits are used to depict the logical operations.)

A listing of the pseudo code of the stored program which enables the system to perform the logical and other processing operations described above is presented below.

PSUEDO CODE

```
PROCEDURE: MAIN
Recognizes a codeline from a document image.
while (NOT_END_OF_DOCUMENT)
{
if (FIND_FIRST_CHARACTER finds a
character)
then
RECOGNIZE_FIELD
else
END_OF_DOCUMENT
}
PROCEDURE: FIND FIRST CHARACTER
do
{
SCAN_IMAGE_FOR_WHITE_TO_BLACK_TRANSITION
}
until (FOUND_CHARACTER or END_OF_DOCUMENT)
PROCEDURE: RECOGNIZE FIELD
do
{
RECOGNIZE CHARACTER
move_to_next_position
}
while (FOUND_CHARACTER)
```

-continued

PSUEDO CODE

```
PROCEDURE: RECOGNIZE CHARACTER
{
BINARIZE_CHARACTER_IMAGE
TEMPLATE_RECOGNITION_OF_CHARACTER
if REJECTED
then
ENHANCED_BINARIZE_CHARACTER_IMAGE
TEMPLATE_RECOGNITION_OF_CHARACTER
}
```

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated. For example, in addition to the E13B (and OCRA and OCRB) type characters discussed herein, the various calculations performed by the system can be easily modified to enable the system to read images of any resolution with characters of various sizes.

What is claimed is:

1. Optical character recognition system comprising:
means for optically scanning a character recorded on a document, the character and document having different opacities, and producing a plurality of gray-scale values corresponding to said opacities, said gray-scale values representing light and dark pixels:
memory means disposed for storing the gray-scale values, said memory means including a stored program, and predetermined data including a plurality of predetermined binary patterns, one of said predetermined binary patterns representing the character, each predetermined binary pattern including first, second, and third bit configuration, said first bit configuration representing an actual bit pattern of the character, said second bit configuration representing predetermined significance of respective bits of the actual bit pattern, and said third bit configuration representing weighted values of respective bits of the actual bit pattern; and
processing means coupled to the scanning means and to the memory means, and operating under control of the stored program, for locating the character on the document by selecting from said gray-scale values a matrix of values representative of the character, for converting the matrix values to binary data, and for selecting from the plurality of predetermined binary patterns a pattern that matches the converted binary data, said matching pattern serving to identify the character.

2. The system as in claim 1 wherein said character has a right, left, top and bottom edge, and said scanning means includes a means for reading from the bottom edge to the top edge in a vertical direction.

3. The system as in claim 2 wherein said processing means includes a means for framing a region having a plurality of pixels proximate to a dark pixel.

4. The system as in claim 3 wherein said framing means includes a means for defining a window for bordering said region.

5. The system as in claim 4 wherein said framing means includes a means for positioning the window so that the sum of the gray-scale values within the window is a maximum, corresponding to the character being centrally located in the window, said maximum-sum values corresponding to a matrix of selected pixel values representative of the character.

6. The system as in claim 5 wherein said framing means also includes a means for confirming the presence of a character within the window, by determining the total number of pixels in the window that exceeds a predetermined confirmation threshold.

7. The system as in claim 6 wherein said processing means includes a means for calculating an average threshold value for said selected pixel values.

8. The system as in claim 7 wherein said calculating means includes a means for producing binary data representative of the magnitudes of said selected pixel values relative to said average threshold value.

9. The system as in claim 8 wherein said processing means includes a means for producing a mismatch count for each predetermined binary pattern said count being indicative of the extent of mismatch between the predetermined binary pattern and the converted binary data.

10. The system as in claim 9 wherein said means for producing a mismatch count includes a means for selecting from the mismatch counts the count that best satisfies at least one predetermined threshold criterion.

11. The system as in claim 10 wherein the means for producing a mismatch count includes a means for producing mismatch words and calculating a count based on the contents of selected ones of said words, said words being indicative of the extent of mismatch between the converted binary data and selected bit configurations of said predetermined binary pattern.

12. The system as in claim 11 wherein said means for producing a mismatch count includes a logic means for performing an exclusive-OR operation between the converted binary data and the first bit configuration to produce a first mismatch word.

13. The system as in claim 12 wherein said means for producing a mismatch count includes a logic means for performing an AND operation between the first mismatch work and the second bit configuration to produce a second mismatch word.

14. The system as in claim 13 wherein said means for producing a mismatch count includes a logic means for performing an AND operation between the second mismatch word and the third bit configuration to produce a third mismatch word.

15. The system as in claim 14 wherein each of said predetermined binary patterns represents a predetermined template, and said framed character may be compared against a predetermined template in each of nine positions, a center position and eight non-center positions, and said means for producing a mismatch count includes a means for positioning a template relative to the center portion of the framed character.

16. The system as in claim 15 wherein said means for positioning places the predetermined binary pattern relative to one of the non-center portions of the framed character.

17. The system as in claim 16 wherein said gray-scale values are in the range 0 to 255.

18. The system as in claim 17 wherein said character is a member of a selected character set.

19. The system as in claim 18 wherein said character and said window are each of a predetermined size for a selected font.

20. The system as in claim 19 wherein each bit-configuration of said predetermined binary pattern is a first predetermined number of pixels wide by a second predetermined number of pixels high.

21. Method of optically identifying a character on a document, the character and document having different opacites, the method comprising the steps of:
optically scanning the document and producing a plurality of gray-scale values corresponding to said opacities, said gray-scale values representing light and dark pixels;
locating the character by selecting, from said gray-scale values, a matrix of values representative of the character;
converting the matrix values to binary data;
representing the character as one of a plurality of predetermined binary pattern including first, second, and third bit configurations, said first bit configuration representing an actual bit pattern of the character, said second bit configuration representing predetermined significance of respective bits of the actual bit pattern, and said third bit configuration representing weighted values of respective bits of the actual bit pattern; and
selecting from the plurality of predetermined binary patterns a pattern that matches.

22. The method of claim 21 where the step of optically scanning the document includes the step of reading each character on the document from bottom to top in a vertical direction.

23. The method of claim 22 where the step of locating the character includes the step of framing a region having a plurality of pixels proximate to a dark pixel.

24. The method of claim 23 where the step of framing includes the step of defining a window for bordering said region.

25. The method of claim 24 where the step of framing also includes the step of positioning the window so that the sum of the gray-scale values within the window is a maximum, corresponding to the character being centrally located in the window, said maximum-sum values corresponding to a matrix of selected pixel values representative of the character.

26. The method of claim 2 where the step of framing the character includes the step of confirming the presence of a character within the window, by determining the total number of pixels in the window that exceeds a predetermined confirmation threshold.

27. The method of claim 26 where the step of converting includes the step of calculating an average threshold value from the values represented by the dark pixels of the framed character.

28. The method of claim 27 where the step of converting also includes the step of producing binary data representative of the magnitudes of said selected pixel values relative to said average threshold value.

29. The method of claim 28 where the step of selecting a predetermined binary pattern that matches the converted binary data includes the step of producing a mismatch count for each predetermined binary pattern, said count being indicative of the extent of mismatch between the predetermined binary pattern and the converted binary data.

30. The method of claim 29 wherein the step of selecting a predetermined binary pattern also includes the step of selecting from the mismatch counts the count that best satisfies at least one predetermined threshold criterion.

31. The method of claim 30 where the step of producing a mismatch count includes the steps of producing mismatch words and calculating a count based on the contents of selected ones of said words, said words being indicative of the extent of mismatch between the converted binary data and selected bit configurations of said predetermined binary pattern.

32. The method of claim 31 where the step of producing a mismatch count includes the step of performing an exclusive-OR logical operation between the converted binary data and the first bit configuration for producing a first mismatch word.

33. The method of claim 32 where the step of producing a mismatch count includes the step of performing an AND logical operation between the first mismatch words and the second bit configuration for producing a second mismatch word.

34. The method of claim 33 where the step of producing a mismatch count further includes the step of performing AND logical operation between the second mismatch word and the third bit configuration for producing a third mismatch word.

35. The method of claim 34 where the framed character may be divided virtually into nine portions, a center portion and eight non-center portions, and the step of producing a mismatch count includes the step of positioning a predetermined binary pattern relative to the center portion of the framed character.

36. The method of claim 35 where the step of positioning includes placing the predetermined binary pattern relative to one of the eight non-center portions of the framed character.

37. Method of identifying a character imaged on a document, the character and document having different opacities, the document being optically scanable, with images thereon representable as a plurality of stored gray-scale pixel values corresponding to said opacities, the method comprising the steps of:

locating the character by selecting from said gray-scale pixel values a matrix of values representing the character;

converting the matrix value to binary data;

representing the character as one of a plurality of predetermined binary patterns, each predetermine binary pattern including first, second, and third bit configuration, said first bit configuration representing an actual bit pattern of the character, said second bit configuration representing predetermined significance of respective bits of the actual bit pattern, and said third bit configuration representing weighted values of respective bits of the actual bit pattern; and identifying the character by selecting, from the plurality of predetermined binary patterns, a pattern that matches the converted binary data.

* * * * *

UNITED STATES PATENT AND TRADEMARK OFFICE
CERTIFICATE OF CORRECTION

PATENT NO. : 5,091,968
DATED : Feb. 25, 1992
INVENTOR(S) : Higgins et al.

It is certified that error appears in the above-identified patent and that said Letters Patent is hereby corrected as shown below:

Column 13, line 41, "work" should be --word--.

Column 14, line 15, "pattern" should be --patterns--.

Column 14, line 42, "2" should be --25--.

Column 15, line 15, "words" should be --word--.

Column 16, line 16, "predetermine" should be --predetermined-- second occurrence.

Column 16, line 18, "configuration" should be --configurations--.

Signed and Sealed this

Twenty-first Day of December, 1993

Attest:

BRUCE LEHMAN

Attesting Officer    Commissioner of Patents and Trademarks